United States Patent Office 3,247,190
Patented Apr. 19, 1966

3,247,190
PROCESS FOR THE MANUFACTURE OF 4β,19-OXIDO-STEROIDS
Albert Wettstein, Riehen, Georg Anner, Karl Heusler, and Jaroslav Kalvoda, Basel, and Charles Meystre, Reinach, Basel-Land, Switzerland, assignors to Ciba Corporation, New York, N.Y., a corporation of Delaware
No Drawing. Filed Sept. 12, 1962, Ser. No. 223,245
Claims priority, application Switzerland, Sept. 22, 1961, 11,072/61; May 25, 1962, 6,358/62; Aug. 13, 1962, 9,683/62; Aug. 28, 1962, 10,173/62
13 Claims. (Cl. 260—239.55)

Subject of the present invention is a process for the manufacture of 4β,19-oxido-steroids starting from 19-unsubstituted 4β-hydroxy-steroids. Said oxido-steroids can be used, for example, for the preparation of important 19-nor-steroids (anabolic and progestative agents), such as derivatives of 19-nor-testosterone and 19-nor-progesterone and the 3-desoxo derivatives thereof, e.g. $\Delta^4$-17β-hydroxy-17α-ethinyl-19-nor-androstene.

The process according to the present invention consists in reacting 19-unsubstituted 4β-hydroxy-5α-steroids with an oxidizing leadacylate in a solvent and, if desired, hydrolyzing and/or oxidizing the obtained 4β,19-oxido-steroids.

The reaction occurring in the above said process may be represented, for example, by the following scheme of partial formulae:

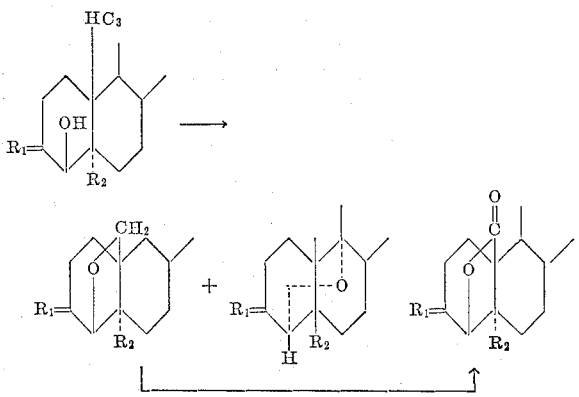

in which formulae $R_1$ represents two hydrogen atoms, a hydrogen atom together with an etherified or esterified hydroxyl group, or a ketalized oxo group and $R_2$ stands for a hydrogen or halogen atom or an etherified or esterified hydroxyl group, $R_1$ and $R_2$ taken together may also represent the radical of a dibasic acid or of a lower aliphatic or araliphatic diol.

As byproducts there are obtained 3α,9α-oxido-5β-steroids, especially if starting materials are selected, which are unsubstituted in 3- and 5-position. Such byproducts, however, can easily be separated, for example by chromatographic purification of the crude reaction product.

The starting materials for the present process are 4β-hydroxy-compounds of the androstane, pregnane, cholane, cholestane, stigmastane, spirostane and cardanolide series, which may contain in the ring system, especially in one or more of the positions 1, 2, 3, 5, 6, 7, 8, 9, 11, 12, 14, 15, 16, 17, 20 and 21 further substitutents, such as free or functionally converted oxo groups, esterified or etherified hydroxyl groups, lower alkyl or alkenyl groups, e.g. methyl, ethyl, vinyl, or allyl groups, and/or halogen atoms. Functionally converted oxo groups are ketalized oxo groups or oxo groups converted into enol derivatives, e.g. enol ethers or enol esters. Furthermore the starting materials may contain double bonds or oxido groups for example in positions 9,11 and/or 16,17.

Valuable starting materials are, for example, such 4β-hydroxy-steroids which contain in position 3 and, if desired, also in position 5, the substitutents $R_1$ and $R_2$ as indicated above; such substituents are suitable for the formation of the $\Delta^4$-3-oxo-grouping after opening of the 4β,19-oxido bridge. There are particularly to be mentioned derivatives of 3α,4β,5α-trihydroxy-steroids, such as cyclic carbonates, sulfites, acetonides or benzal compounds, or especially 3-esters and 3-ethers of 3,4β-dihydroxy-5α-halogen-steroids or ketals of 3-oxo-4β-hydroxy-5α-halogen-steroids.

Specific starting materials are for example the following compounds: 3β,17β-diacetoxy-4β-hydroxy-androstane, 3β,17β-diacetoxy-4β-hydroxy - 17α - methyl-androstane, the 3,5-carbonate of the 3α,4β,5α-trihydroxy-17-oxo-androstane, 3β,17β-diacetoxy-4β-hydroxy-5α-chloro-androstane, 3β,17β-diacetoxy-4β-hydroxy-5α-bromo - androstane, 3β,17β-diacetoxy-4β-hydroxy - 5α - chloro-17α-methyl-androstane, 3β,17β - diacetoxy - 4β - hydroxy - 5α-bromo-17α-methyl-androstane, 3β,20β - diacetoxy-4β-hydroxy-5α-chloro-pregnane, 3β,20β-dipropionyloxy-4β-hydroxy-5α-bromo-pregnane, 3β-acetoxy - 4β - hydroxy-5α-chloro-20-oxo-pregnane or 3β-acetoxy - 4β - hydroxy-5α-chloro-spirostane.

Especially important starting materials for the manufacture of 3-unsubstituted 4β,19-oxido-steroids are, for example, the 3-unsubstituted 4β-hydroxy-steroids, such as 4β-hydroxy-androstanes, which contain in 17-position an oxo group or an esterified or etherified hydroxyl group, e.g. 4β-hydroxy-5α-chloro-17-oxo-androstane, 4β-hydroxy-17-oxo-androstane; 17-esters of the 4β,17β-dihydroxy-5α-chloro-androstane and the 4β,17β-dihydroxy-androstane, such as the 17-acetate, 17-propionate or 17-benzoate, 17-esters of the 4β,17β-dihydroxy-17α-methyl-5α-chloro-androstane and 4β,17β-dihydroxy-17α-methyl-androstane. Said starting materials are known or, if new, can be prepared according to known methods. The 4β-hydroxy-5α-halogen-steroids can be prepared for example by adding on a hypohalogenous acid to the double bond of corresponding 4,5-unsaturated compounds. 4β-hydroxy-steroids can also easily be prepared by catalytic hydrogenation of the corresponding 4-ketones with a platinum catalyst in acidic solution, such as in glacial acetic acid, or by hydrolytic cleavage of 4,5-epoxides.

The oxidizing lead acylates, used in the process of the invention, are for example leadtetraacylates, of which the acid component is derived, for example, of a lower aliphatic, cycloaliphatic, araliphatic, or aromatic carboxylic acid, such as acetic, propionic, trifluoroacetic, hexahydrobenzoic, phenylacetic or benzoic acid. There can also be used dialkyl leaddiacylates, such as diethyl lead diacetate, or anhydrides of metal leadacid with the above carboxylic acids, such as diacetoxy-leadoxide.

The process according to the present invention can be performed, for example, by heating the starting material, if desired, in the presence of a weak inorganic or organic base, such, for example, as alkaline earth metal carbonates, e.g. calcium, barium or strontium carbonate, or tertiary amines, e.g. pyridine, with an excess of the oxidizing lead acylate, preferably in a non-polar solvent which is inert to the oxidative agent, for example to the boiling point of the latter, preferably to a temperature above 60°, and isolating the desired 4β,19-oxido-steroids according to known methods.

Particularly suitable solvents are aliphatic, cycloaliphatic or aromatic hydrocarbons, such as hexane, heptane, cyclohexane, methylcyclohexane, dimethylcyclohexane or benzene. The requisite time of reaction usually depends on the temperature, preferably a reaction time of 4 to 20 hours is necessary.

If desired, the oxygenated C-19-methyl group of 19-unsubstituted 4β,19-oxides can be further oxidized under more drastic conditions, which can be effected, for example, by using strong oxidation agents, such as ruthenium tetroxide or especially derivatives of hexavalent chromium, e.g. chromic acid or tertiary butyl chromate, in solvents, such as lower fatty acids, e.g. acetic or propionic acid, or chlorinated hydrocarbons, e.g. carbon tetrachloride, especially at an elevated temperature, such as between 50 and 100°. There are obtained 4β,19-lactones of 4β-hydroxy-steroid-19-acids. The latter may be reduced, for example according to the process of U.S. patent application Serial No. 180,029, filed March 15, 1962, by Albert Wettstein et al., now U.S. Patent No. 3,165,511, with dialkyl-aluminumhydrides, such as diisobutyl aluminumhydride at low temperature. The reduction products are 4β,19-oxido-19-hydroxy-compounds which are the cyclohemiacetals of 4β-hydroxy-19-oxo-steroids.

On the other hand, an acyloxy group present in a 4β,19-oxide obtained by the present process, for example in position 3 and 17 or 20, can be hydrolyzed and the resulting hydroxy compound oxidized to a 3-ketone, 3,17-diketone or 3,20-diketone.

The 4β,19-oxido steroids obtained according to the present invention can be transformed into pharmacologically active compounds, for example, as described in our U.S. patent application Serial No. 223,258, filed Sept. 12, 1962.

The compounds obtained according to the process of the present invention are especially saturated and unsaturated 4β,19-oxido-steroids of the androstane and pregnane series such, for example, as 3-hydroxy-5α-halogen- or -hydroxy-4β,19-oxido-androstanes and their esters, such as 3β,17β - dihydroxy-5α-chloro- or -bromo-4β,19-oxido-androstane, 3β-hydroxy-5α-chloro- or -bromo-4β,19-oxido-17 - oxo - androstane, 3β,17β-dihydroxy-5α-chloro- or -bromo-4β,19-oxido-17α-alkyl-, such as -methyl- or ethyl-androstane, 3β,17β-dihydroxy-5α-chloro- or -bromo-4β,19-oxido-17α-alkenyl-androstanes, 3β,17β-dihydroxy - 5α-chloro- or -bromo-4β,19-oxido-17α-ethinyl - androstane and the esters of these compounds, such as the 3,5-carbonate of the 3α,5α-dihydroxy-4β,19-oxido-17-oxo-androstane. There are also to be mentioned the compounds which correspond to those mentioned above and have a 3-oxo group instead of the 3-hydroxy group and their esters and also the 3-unsubstituted 4β,19-oxido-androstanes, such as 4β,19-oxido-17β-hydroxy-androstane, 4β,19-oxido-17β - hydroxy-17α-methyl-androstane or 4β,19-oxido-17-oxo-androstane, 4β,19-oxido - 5α - halogen-androstanes, such as 4β,19-oxido-5α-chloro- or -bromo-17-oxo-androstane, 4β,19-oxido-5α-chloro- or -bromo-17β-hydroxy-androstane and the esters thereof. The present invention also comprises 3-hydroxy-5α-halogen- or -hydroxy-4β,19-oxido-pregnanes and their esters, for example such as contain in 20-position a free or esterified hydroxyl group or free or ketalized oxo group, especially 3β,20-dihydroxy-5α-chloro- or -bromo-4β,19-oxido-pregnane, 3β-hydroxy-5α-chloro- or -bromo-4β,19-oxido-20-oxo-pregnane, 3β-hydroxy-5α-chloro- or -bromo-4β,19,16,17α-bis-oxido-20-oxo-pregnane, 3β,17α-dihydroxy-5α-chloro- or -bromo-4β,19-oxido-20-oxo-pregnane and the esters thereof such, for example, as the 3,5-carbonate of the 3α,5α-dihydroxy-4β,19-oxido-20-oxo-pregnane or the esters thereof; the corresponding 3-oxo-5α-halogeno-compounds and the 4β,19-oxido-pregnanes unsubstituted in position 3 or 3 and 5, and the esters of these compounds.

Especially valuable final products obtainable according to the process of the present invention are compounds of the Formulae I and II (I)

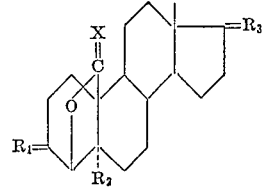

and (II)

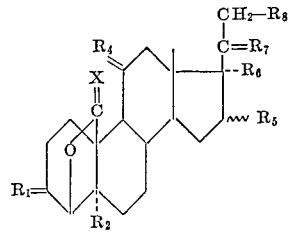

in which $R_1$ represents two hydrogen atoms, a hydrogen atom together with a free, esterified or etherified hydroxyl group, an oxo group or a lower alkylenedioxy group, $R_2$ stands for a hydrogen or halogen atom or a free esterified or etherified hydroxyl group, $R_1$ and $R_2$ when taken together may also represent the radical of a dibasic acid or a lower aliphatic or araliphatic diol, $R_3$ is an oxo group, a lower alkenedioxy group or a hydrogen atom or a lower aliphatic hydrocarbon radical, such as an alkyl, alkenyl or alkinyl group, together with a β-positioned free esterified or etherified hydroxyl group, X represents two hydrogen atoms or an oxo group, $R_4$ stands for two hydrogen atoms, a hydrogen atom and a free or esterified hydroxyl group, or an oxo group, $R_5$ is a hydrogen atom, a methyl group or a free or esterified or etherified hydroxyl group, $R_5$ and $R_6$ when taken together may also represent the radical of a lower aliphatic or araliphatic diol, $R_6$ and $R_8$ are hydrogen atoms, or a free, esterified or etherified hydroxyl group and $R_7$ represents a hydrogen atom together with a free or esterified hydroxyl group, an oxo group or a lower alkenedioxy group.

In the above mentioned esters the acyl radicals are especially such of aliphatic, cycloaliphatic, araliphatic and aromatic carboxylic acids with 1–15 carbon atoms, such as formic, methyl- or ethyl-carbonic, acetic, trifluoroacetic, propionic, butyric, trimethylacetic, valeric, caproic, enanthic, decanoic, hexahydrobenzoic, cyclopentylpropionic, phenylpropionic or furanecarboxylic acid.

Etherified hydroxyl groups are for instance lower alkyloxy groups or the tetrahydro-pyranyloxy group.

The present invention also includes any variant of the present process in which only some of the process steps are carried out, if desired in a different order of succession, or in which an intermediate obtained at any stage of the process is used as starting material and any remaining steps are carried out.

The following examples illustrate the invention.

*Example 1*

500 mg. of 4β-hydroxy-17β-propionyloxy-5α-androstane are added to a suspension, previously heated for a short time to 80° C., of 5.0 grams of previously dried lead tetraacetate and 1.50 grams of calcium carbonate in 150 ml. of cyclohexane. The reaction mixture is then refluxed for 16 hours, cooled, any inorganic constituents filtered off, the filtrate washed with 50 ml. of potassium iodide solution of 10% strength and with 50 ml. of a sodium thiosulphate solution of 10% strength, dried and evaporated in a water-jet vacuum. There are obtained 490 mg. of a crystalline crude product which, according to the thin-layer chromatogram, consists of three components. The mixture is chromatographed on alumina (activity II) to yield 216 mg. of pure 4β,19-oxido-17β-propionyloxy-5α-androstane which, after being recrystallized from methanol, melts at 109–110° C.; optical rotation $[\alpha]_D = +22°$; in the infrared spectrum there are absorption bands, inter alia at $5.78\mu$, $8.37\mu$, $9.26\mu$, $9.66\mu$, $9.82\mu$, $9.94\mu$, $10.02\mu$ and $11.90\mu$. The nuclear magnetic resonance spectrum tallies with the above-mentioned structure of the compound. By further chromatography of the mother liquors on silica gel and subsequent crystallization of the corresponding fractions a further 130 mg. of the same product melting at 112–114° C., in addition to about 10% of 4-oxo-17β-propionyloxy-5α-androstane (M.P. 119–121° C.) and about 15% of the amorphous 4α,9α-oxido-17β-propionyloxy-5β-androstene, are obtained.

The 4β-hydroxy-17β-propionyloxy-5α-androstane used as starting material may be prepared as follows: 5.0 grams of $\Delta^4$-17β-propionyloxy-androstene are dissolved in 75 ml. of glacial acetic acid, reacted with 30 ml. of concentrated nitric acid and 3.0 grams of sodium nitrite and the resulting $\Delta^4$-4-nitro-17β-propionyloxy-androstene reduced, without purification, in 34 ml. of glacial acetic acid and 5 ml. of water with 10 grams of zinc for 4 hours at 100° C. Chromatographic purification of the so-obtained crude product on alumina yields the pure 4-oxo-17β-propionyloxy-5α-androstane (optical rotation $[\alpha]_D = +3.5°$) melting at 119–121° C. Catalytic hydrogenation of the compound with platinum oxide in glacial acetic acid yields 4β-hydroxy-17β-propionyloxy-5α-androstane which, after recrystallization from a mixture of ether and petroleum ether, melts at 157–159° C.; optical rotation $[\alpha]_D = +5.1°$.

Example 2

Using the same conditions as described in Example 1, from 1.0 gram of 4β-hydroxy-5α-bromo-20β-acetoxy-pregnane, there is obtained in addition to about 5% of 4-oxo-5α-bromo-20β-acetoxy-pregnane, 4β,19-oxido-5α-bromo-20β-acetoxy-pregnane in 65–70% yield which is reduced in 15 ml. of glacial acetic acid with 3 grams of zinc powder for 20 minutes at 50° C. without previous purification. The resulting crude $\Delta^4$-19-hydroxy-20β-acetoxy-pregnene is converted in a manner known per se by drastic oxidation with chromium (VI) oxide in glacial acetic acid, followed by basic hydrolysis and further oxidation, into 19-nor-progesterone melting at 143–145° C.

The 4β-hydroxy-5α-bromo-20β-acetoxy-pregnane used as starting material is prepared from $\Delta^4$-3-oxo-20β-acetoxy-pregnene by reaction with ethylenedithioglycol, desulphurizing the resulting 3-thioketal with sodium in liquid ammonia, after acetylation, and additively combining hypobromous acid with the $\Delta^4$-double bond by reaction with N-bromosuccinimide.

Example 3

500 mg. of 4β,19-oxido-17β-propionyloxy-5α-androstane are treated in 10 ml. of glacial acetic acid for 30 minutes at 90° C. with a solution of 700 mg. of chromium (VI) oxide in 0.7 ml. of water and 6 ml. of glacial acetic acid. The cooled reaction mixture is then diluted with water and extracted with methylene chloride. The methylene chloride solution is washed in succession with water, saturated sodium bicarbonate solution and with water, dried and evaporated at a water-jet vacuum. One recrystallization of the crude product from a mixture of methylene chloride and petroleum ether yields 210 mg. of pure 4β,19-lactone of 4β-hydroxy-17β-propionyloxy-5α-androstane-19-acid melting at 188–190° C.; optical rotation $[\alpha]_D = -17°$.

Example 4

2.2 grams of previously dried lead tetraacetate, 700 mg. of barium carbonate and 200 mg. of 3β,17β-diacetoxy-4β-hydroxy-5α-chloro-androstane in 50 ml. of benzene are refluxed for 16 hours with stirring. The cooled reaction solution is then filtered, the residue washed with about 100 ml. of benzene, the combined filtrates washed with a potassium iodide and sodium thiosulphate solution of 10% strength, dried and evaporated at a water-jet vacuum. The resulting crude product is chromatographed on thirty times its quantity of neutral alumina (activity II), 125 mg. of pure 3β,17β-diacetoxy-4β,19-oxido-5-α-chloro-androstane being obtained (characteristic infrared bands inter alia at $5.78\mu$, $7.28\mu$, $8.15\mu$, $9.71\mu$ and $9.90\mu$). A solution of the above compound is heated for 1 hour in 5 ml. of methanol and 1 ml. of water with 200 mg. of potassium hydroxide at 60° C. and is thereby converted into the crude 3β,17β-dihydroxy-4β,19-oxido-5α-chloro-androstane which is obtained by precipitation with water from the cooled reaction solution. The last-mentioned compound (70 mg.) is dissolved in 4 ml. of acetone, without previous purification, and treated at about 0° C. dropwise with 0.2 ml. of an 8 N-chromium (VI) oxide solution in sulphuric acid. After the same temperature has been maintained for 30 minutes, the reaction solution is diluted with 20 ml. of water and extracted with a mixture of ether and methylene chloride 1:1. The residue is washed neutral with water, sodium bicarbonate solution and again with water, dried with sodium sulphate and evaporated at a water-jet vacuum to yield 58 mg. of crude 3,17-dioxo-4β,19-oxido-5α-chloro-androstane (infrared bands inter alia at $5.87\mu$ and $7.25\mu$). The product is dissolved in 2 ml. of glacial acetic acid and, after the addition of 2 drops of water, reduced with stirring for 30 minutes at 100° C. with 800 mg. of zinc powder. The reaction solution is filtered off from the excess metal, diluted with methylene chloride, evaporated at a water-jet vacuum, the residue taken up in methylene chloride, washed neutral with saturated sodium bicarbonate solution and with water, the solution dried and evaporated. The crude product is recrystallized twice from a mixture of acetone and petroleum ether to yield 32 mg. of $\Delta^4$-3,17-dioxo-19-hydroxy-androstene melting at 168–172° C./180° C.

Example 5

100 mg. of 4β,19-oxido-17β-propionyloxy-5α-androstane in 5 ml. of acetic anhydride are treated with 150 mg. of para-toluene-sulphonic acid for 15 hours at 20° C. The reaction mixture is then worked up (by adding 5 grams of crystalline sodium acetate, pouring the reaction mixture on to a mixture of ice and water, stirring the whole for 30 minutes, extracting with ether, washing the extracts neutral, drying and evaporating in vacuo) to yield 102 mg. of crude $\Delta^4$-19-acetoxy-17β-propionyloxy-androstene. The above compound is reduced in a tetrahydrofuran solution with excess lithium aluminum hydride, $\Delta^4$-17β,19-dihydroxy-androstene being isolated in practically quantitative yield. Without any further purification the so-obtained product is converted into the crude $\Delta^4$-17-oxo-androstene-19-acid by treating a solution thereof in 5 ml. of acetone at 5° C. with 0.6 ml. of 8 N-chromium (VI) oxide solution in sulphuric acid and subsequent working up. Slow distillation of the compound at a water-jet vacuum followed by chromatographic purification on alumina yield as starting material for the preparation of the highly active $\Delta^{5(10)}$-17β-hydroxy-19-nor-androstene and their esters the pure $\Delta^{5(10)}$-17-oxo-19-nor-androstene which is used as starting material for the preparation of the highly active $\Delta^{5(10)}$-17β-hydroxy-19-nor-androstenes and their esters which are optionally substituted in 17α-position by a saturated or unsaturated hydrocarbon radical.

What is claimed is:

1. Process for the manufacture of 4β,19-oxido-steroids selected from the group consisting of androstanes and pregnanes, wherein a corresponding 19-unsubstituted 4β-hydroxy-5α-steroid is reacted with an acylate of tetravalent lead derived from a member selected from the group consisting of a lower aliphatic, lower cycloaliphatic, monocyclic carbocyclic aryl lower aliphatic and monocyclic carbocyclic aromatic carboxylic acid in an inert solvent.

2. Process as claimed in claim 1, wherein a lead-tetraacylate is used as oxidizing leadacylate.

3. Process as claimed in claim 1, wherein a di-lower alkyl leaddiacylate is used as oxidizing leadacylate.

4. Process as claimed in claim 1, wherein a diacyloxyleadoxide is used as oxidizing leadacylate.

5. Process as claimed in claim 2, wherein leadtetraacetate is used.

6. Process as claimed in claim 1, wherein the process is carried out in the presence of a member selected from the group consisting of a weak inorganic base and a weak organic base.

7. Process as claimed in claim 6, wherein a member selected from the group consisting of an alkaline earth metal carbonate and a tertiary amine is used.

8. Process as claimed in claim 1, wherein a member selected from the group consisting of an aliphatic, cycloaliphatic and aromatic hydrocarbon is used as inert solvent.

9. Process as claimed in claim 1, wherein the reaction is carried out at a temperature between 60° C. and 120° C.

10. Process according to claim 1, wherein the 19-unsubstituted 4β,19-oxido-steroids obtained are oxidized with a member selected from the group consisting of ruthenium tetraoxide, chromium trioxide, chromic acid and tertiary butyl chromate.

11. Process as claimed in claim 1, wherein androstanes of the formula

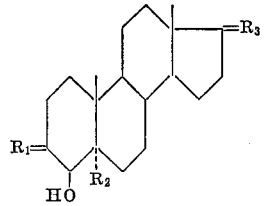

are used as starting material, in which $R_1$ represents a member selected from the group consisting of two hydrogen atoms, a hydrogen atom together with an etherified hydroxyl group, a hydrogen atom together with an esterified hydroxyl group and a ketalized oxo group, $R_2$ stands for a member selected from the group consisting of a hydrogen atom, a halogen atom, an etherified hydroxyl group and an esterified hydroxyl group, $R_1$ and $R_2$ taken together may also represent a hydrogen atom in the 3β-position together with a member selected from the group consisting of carbonyldioxy, sulfinyldioxy, 2,2-propylidenedioxy and benzylidenedioxy, and $R_3$ is a member selected from the group consisting of an oxo group, a ketalized oxo group, a hydrogen atom together with a β-positioned esterified hydroxyl group, a hydrogen atom together with a β-positioned etherified hydroxyl group, a lower aliphatic hydrocarbon radical together with a β-positioned esterified hydroxyl group, a hydrogen aliphatic hydrocarbon radical together with a β-positioned etherified hydroxyl group.

12. Process as claimed in claim 1, wherein pregnanes of the formula

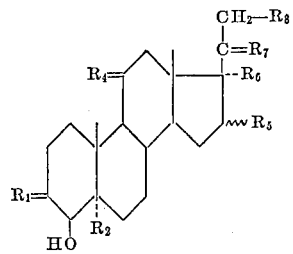

are used as starting material, in which $R_1$ represents a member selected from the group consisting of two hydrogen atoms, a hydrogen atom together with an esterified hydroxyl group, a hydrogen atom together with an etherified hydroxyl group and a ketalized oxo group, $R_2$ stands for a member selected from the group consisting of a hydrogen atom, a halogen atom, an esterified hydroxyl group and an etherified hydroxyl group, $R_1$ and $R_2$ taken together may also represent a hydrogen atom in the 3β-position together with a member selected from the group consisting of carbonyldioxy, sulfinyldioxy, 2,2-propylidenedioxy and benzylidenedioxy, $R_4$ stands for a member selected from the group consisting of two hydrogen atoms, a hydrogen atom together with an esterified hydroxyl group and an oxo group, $R_5$ is a member selected from the group consisting of a hydrogen atom, a methyl group, an esterified hydroxyl group and an etherified hydroxyl group, $R_5$ and $R_6$ when taken together may also represent a member selected from the group consisting of an oxide group, 2,2-propylidenedioxy and benzylidenedioxy, each of $R_6$ and $R_8$ represents a member selected from the group consisting of a hydrogen atom and an esterified hydroxyl group and $R_7$ stands for a member selected from the group consisting of an oxo group, a ketalized oxo group and a hydrogen atom together with an esterified hydroxyl group.

13. A process for the production of 5α-halo-4β,19-oxido-steroids selected from the group consisting of the androstane and pregnane series which comprises reacting the corresponding 5α-halo-4β-hydroxy-19-unsubstituted steroid with a lead tetraacylate in an inert non-polar solvent.

No references cited.

LEWIS GOTTS, *Primary Examiner.*

IRVING MARCUS, *Examiner.*

HENRY A. FRENCH, *Assistant Examiner.*